(12) United States Patent
Mullaly et al.

(10) Patent No.: US 6,553,341 B1
(45) Date of Patent: Apr. 22, 2003

(54) METHOD AND APPARATUS FOR ANNOUNCING RECEIPT OF AN ELECTRONIC MESSAGE

(75) Inventors: John Martin Mullaly, Austin, TX (US); Craig Ardner Swearingen, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,319

(22) Filed: Apr. 27, 1999

(51) Int. Cl.[7] ........................... G06F 17/27; G06F 13/00
(52) U.S. Cl. ............................................ 704/9; 709/206
(58) Field of Search ........................... 704/1, 8, 9, 258, 704/260; 379/93.24, 67, 88, 88.25, 88.13; 709/206

(56) References Cited

U.S. PATENT DOCUMENTS

| | | | | |
|---|---|---|---|---|
| 5,475,738 A | * | 12/1995 | Penzias | 379/67 |
| 5,557,659 A | * | 9/1996 | Hyde-thomson | 379/88 |
| 5,568,540 A | * | 10/1996 | Greco et al. | 379/88 |
| 5,632,002 A | * | 5/1997 | Hashimoto et al. | 704/258 |
| 5,944,786 A | * | 8/1999 | Quinn | 709/206 |
| 6,094,477 A | * | 7/2000 | Nada et al. | 379/93.24 |

* cited by examiner

*Primary Examiner*—Patrick N. Edouard
(74) *Attorney, Agent, or Firm*—Duke W. Yee; Leslie Van Leeuwen; Stephen R. Loe

(57) ABSTRACT

A method and apparatus for announcing receipt of an electronic message. When a message including text is received, the message is filtered determine what will be announced. Text from the filtered message is selectively combined with announcement text to create modified announcement text in which filtered text is selectively placed into the announcement text. The modified announcement text is then transformed into synthesized speech.

37 Claims, 7 Drawing Sheets

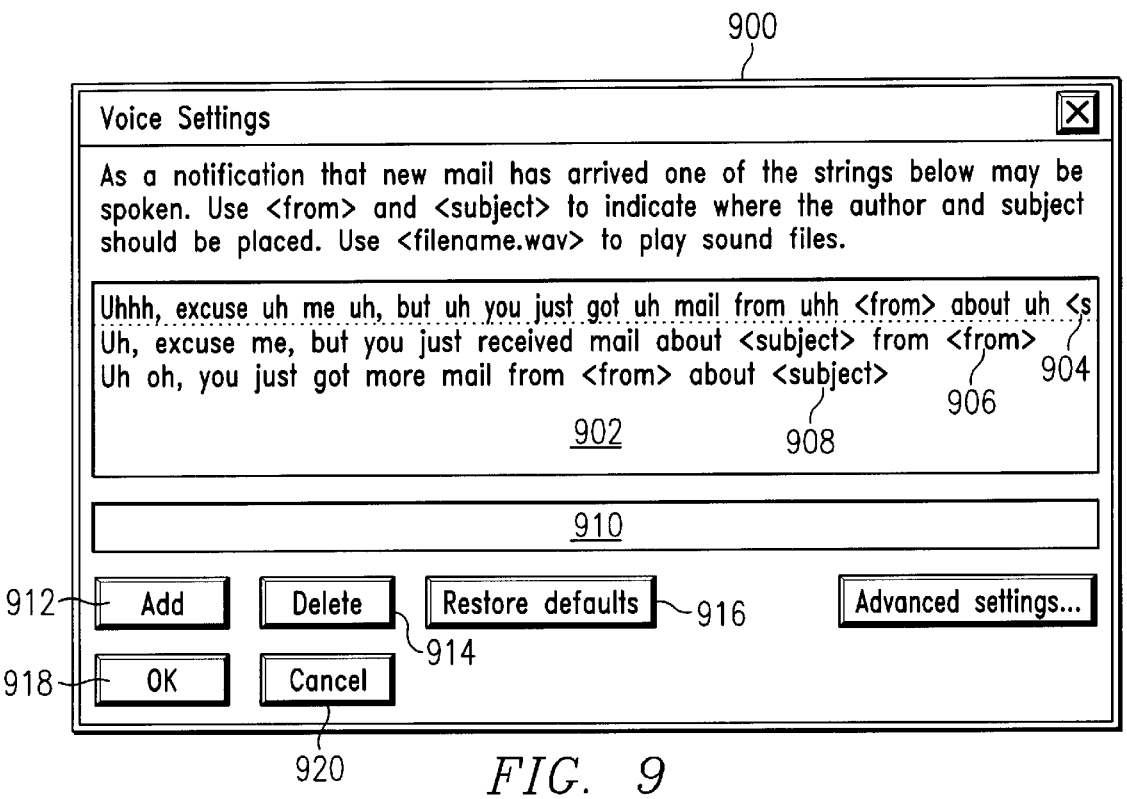
FIG. 9
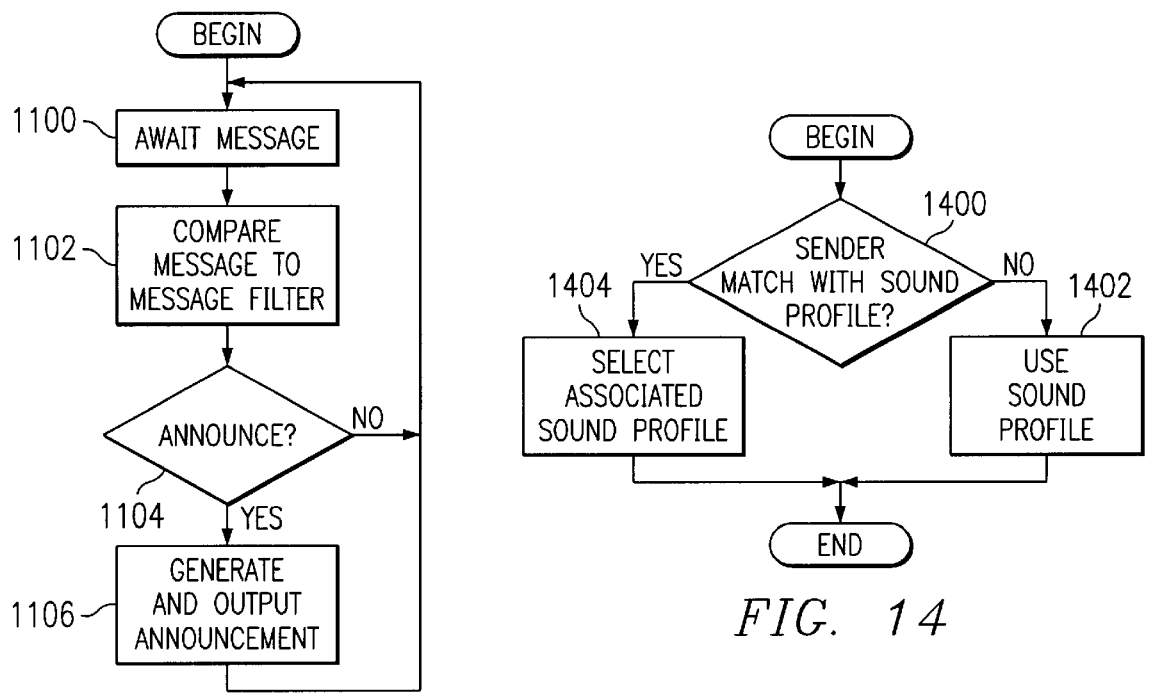
FIG. 11
FIG. 14

METHOD AND APPARATUS FOR ANNOUNCING RECEIPT OF AN ELECTRONIC MESSAGE

CROSS REFERENCE TO RELATED APPLICATIONS

The present invention is related to applications entitled METHOD AND APPARATUS FOR DISPLAYING CONTROLS IN A GRAPHICAL USER INTERFACE, Ser. No. 09/300,332, A METHOD AND APPARATUS FOR SENDING MESSAGES IN A DATA PROCESSING SYSTEM, Ser. No. 09/300,321, A METHOD AND APPARATUS FOR SENDING MESSAGES IN A DATA PROCESSING SYSTEM, Ser. No. 09/300,320, METHOD AND APPARATUS FOR AUTO-EXPANDING AND MANIPULATING DATA FIELDS IN A DATA PROCESSING SYSTEM, Ser. No. 09/300,416, A METHOD AND APPARATUS FOR INTEGRATING ADDRESS BOOKS WITH MOST RECENTLY USED ADDRESS ASSISTANCE, Ser. No. 09/300,317, and METHOD AND APPARATUS FOR FILTERING MESSAGES IN A DATA PROCESSING SYSTEM, Ser. No. 09/300,318, all of which are filed even date hereof, assigned to the same assignee, and incorporated herein by reference.

BACKGROUND OF THE INVENTION

1. Technical Field

The present invention relates to an improved data processing system and in particular to a method and apparatus for managing electronic messages in a data processing system. Still more particularly, the present invention provides a method and apparatus for an announcing receipt of electronic messages in a data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic mail, also referred to as "e-mail". The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

The situation involving network based information, especially the large amounts of e-mail sent between various users may present users with "information overload". Often times a user will check the user's mailbox and find a multitude of new e-mail that has arrived since the last time the user checked for e-mail. This situation can result in important message being ignored or unseen until a later time. Users, however, often desire to be notified when a particular e-mail is received. Likewise, the e-mail containing the desired information may arrive at a time when the user is busy performing another task. In such a case, it is desirable for an arrival of the new e-mail with the desired information to be announced in an audible fashion. Current e-mail systems provide the use of sound effects or recorded statements. These types of notification, however, fail to provide any detail as to the source of the information or the information contained within the e-mail.

Thus, it would be advantageous to have an improved method and apparatus for announcing the receipt of electronic messages, such as e-mail messages.

SUMMARY OF THE INVENTION

The present invention provides a method and apparatus for announcing receipt of an electronic message. When a message including text is received, the message is filtered to determine what will be announced. Text from the filtered message is selectively combined with announcement text to create modified announcement text in which filtered text is selectively placed into the announcement text. The modified announcement text is then transformed into synthesized speech or combined synthesized speech with prerecorded audio. Also, based on user settings, the parameters for voice synthesis can be adjusted to, in effect, announce different types of messages using different predefined synthetic 'voices'.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a diagram of an interface used to customize the playing of voice announcements depicted in accordance with a preferred embodiment of the present invention;

FIG. 11 is a process for generating announcements in response to receiving a message depicted in accordance with a preferred embodiment of the present invention;

FIG. 14 is a flowchart of a process for selecting a profile for use in presenting text through a text-to-voice synthesis engine depicted in accordance with a preferred embodiment of the present invention.

DETAILED DESCRIPTION OF THE PREFERRED EMBODIMENT

Figure 1:
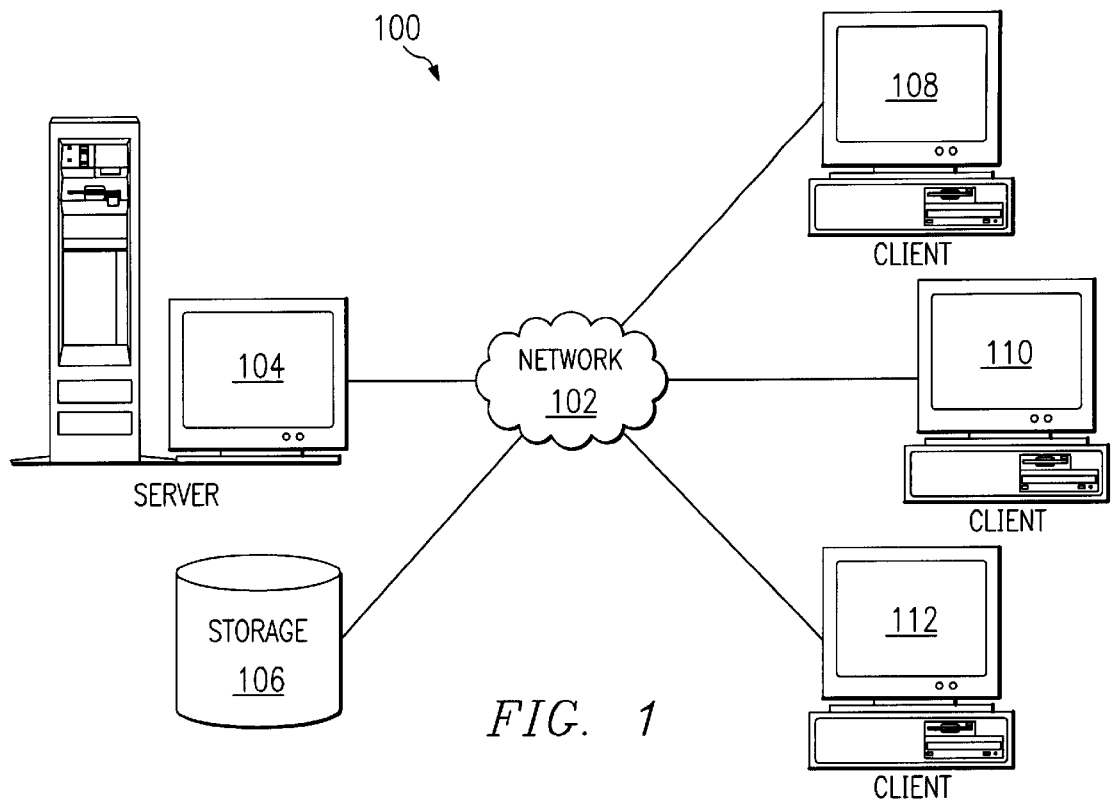
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages.

Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
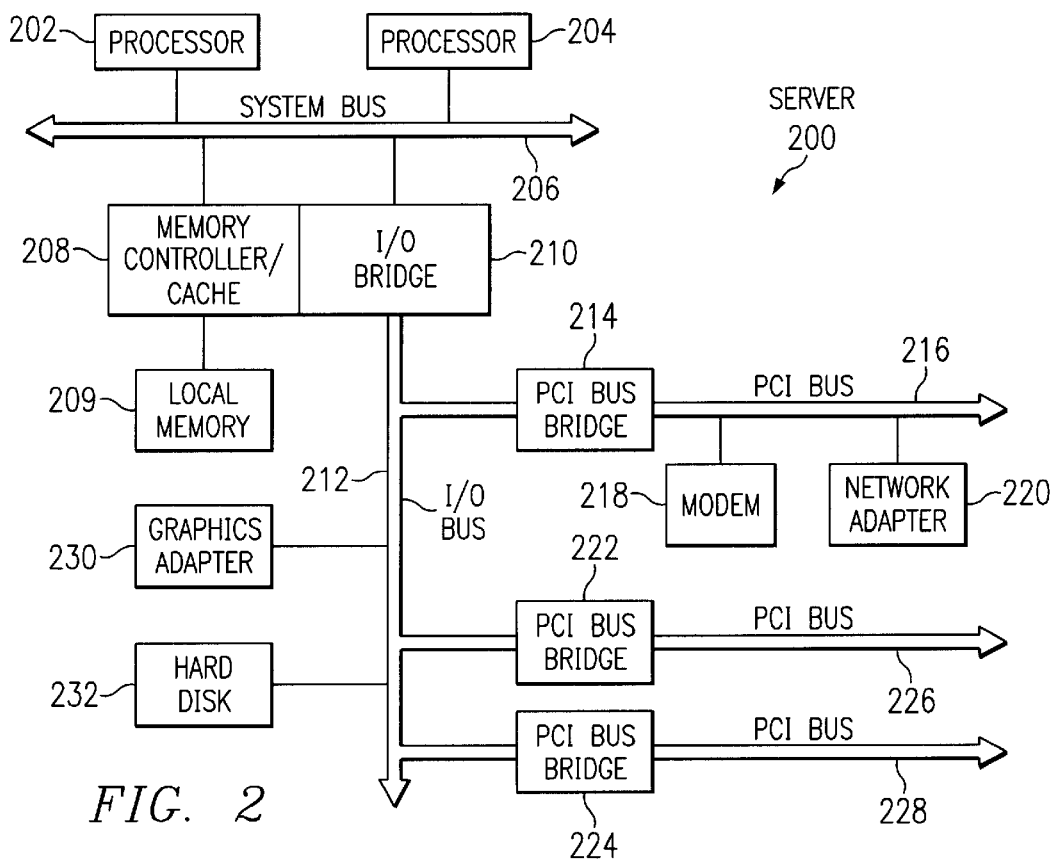
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. In the depicted examples, data processing system 200 is used as a electronic mail message server providing service to a number of clients. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
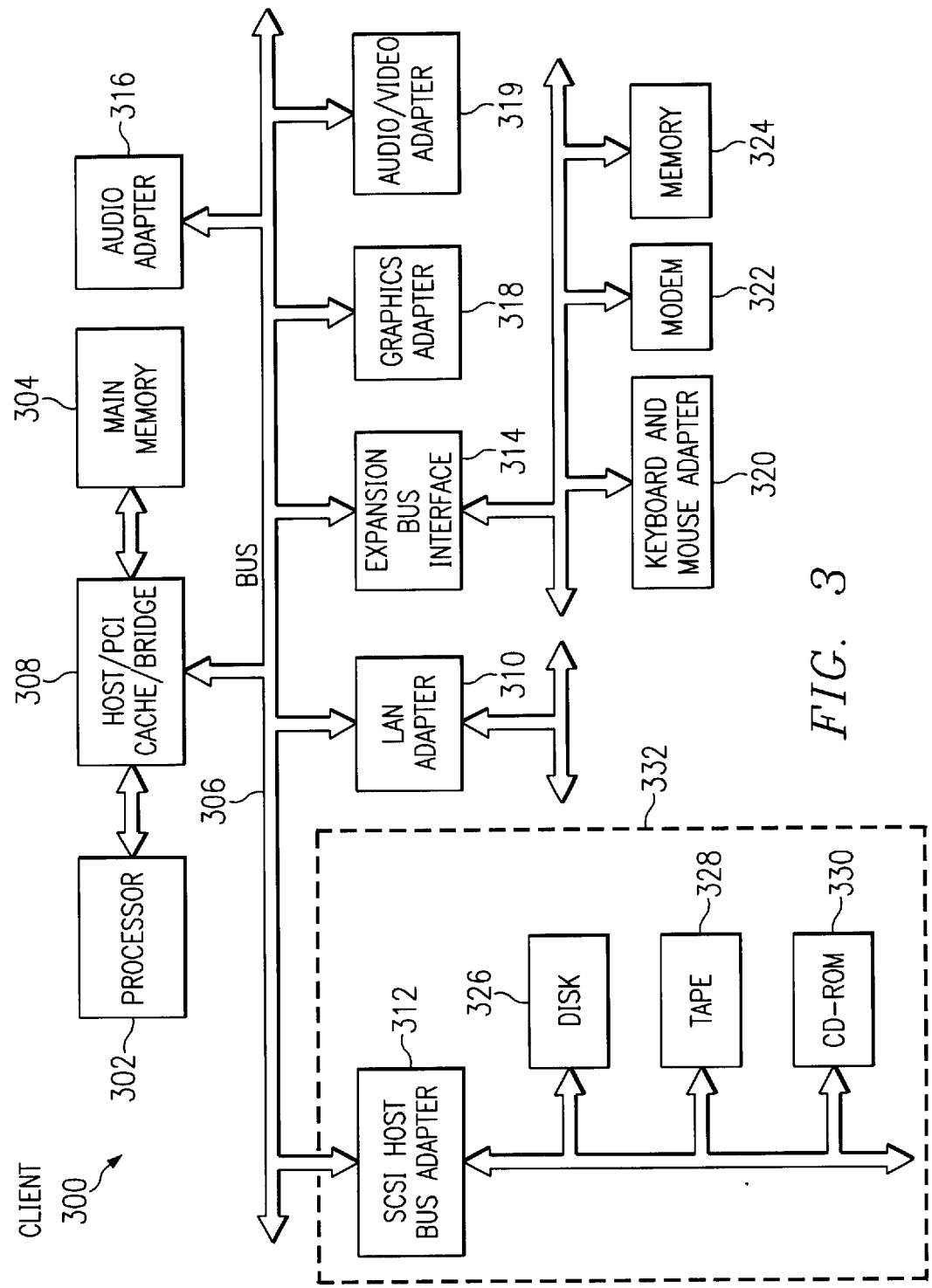
FIG. 3 is a block diagram illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention in provides a method, apparatus, and instructions for an improved e-mail system that provides an audible notification using text to speech technology to announce various details of the message. For example, the identification of the user and the subject of the message may be announced using text-to-speech technology, also referred to as voice synthesis.

Using the mechanism of the present invention, a user may select or customize announcements using natural language sentences, phrases, or anything that the user may desire. To include information that may be parsed or filtered from an incoming message, such as an e-mail message or a news bulletin, the present invention employs a convention to indicate the information that is to be inserted into the announcement. In the depicted examples, indicators in the form of predefined tags enclosed in angle brackets are employed. For example, "<from>" and "<subject>" are examples of tags that may be used in accordance with a preferred embodiment of the present invention. These tags in the depicted examples correspond to predefined fields of information within various types of messages, such as, for example, an e-mail message or a news bulletin. Alternatively, the tags may identify information that is parsed or filtered from anywhere within the message.

Users are also able to specify multiple announcements in which various announcements may be used according to a policy or predefined set of rules. For example, multiple announcements may be selected in which an announcement is selected each time from the multiple announcements in a random fashion. Other rules may be used, such as information containing the word "confidential" would not be announced. Further, such rules could specify different voice profiles supported by presently available text-to-speech technology, which for example may be used to announce the arrival of mail from different people.

Figure 4:
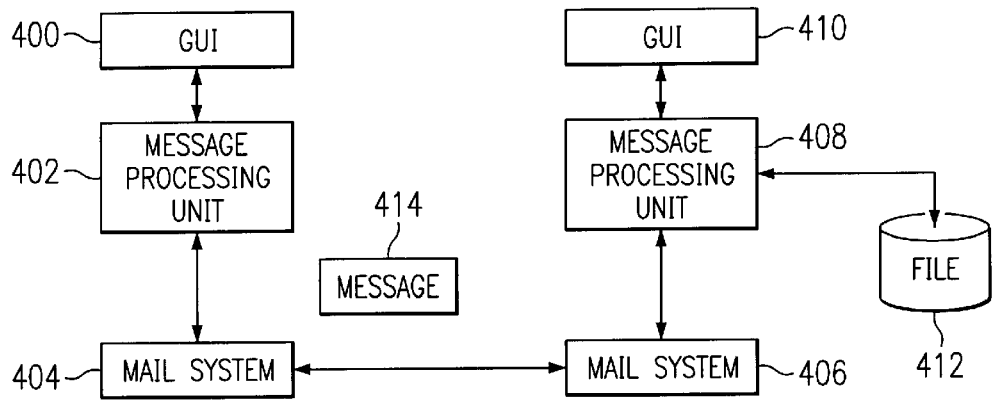
FIG. 4 is a block diagram of a custom messaging system depicted in accordance with a preferred embodiment of the present invention.

With reference now to FIG. 4, a block diagram of a custom messaging system is depicted in accordance with a preferred embodiment of the present invention. In this example, a graphical user interface (GUI) 400 is used in combination with a message processing unit 402 to send an electronic message, such as message 414. In this example, message 414 is sent through mail system 404 to mail system 406 for receipt by message processing unit 408, which provides a display of the message in a message list within GUI 410. In accordance with a preferred embodiment of the present invention, a customized text-to-speech announcement based on the content of the message is announced or presented by message processing unit 408 to the user. Announcements may be stored within file 412 for use when message processing unit 408 receives a message.

In this example, GUI 400, message processing unit 402, and mail system 404 may be located at one client while GUI 410, message processing unit 408, and mail system 406 are located at another client in a distributed data processing system. In these examples, mail system 404 and mail system 406 are legacy mail systems while GUI 400, message processing unit 402, GUI 410, and message processing unit 408 implement processes of the present invention. These clients may be implemented using a data processing system, such as data processing system 300 in FIG. 3. Message processing unit 402 and message processing unit 408 process messages created and received by the user through presently available or legacy mail system processes found in mail system 404 and mail system 406. The legacy mail systems may be implemented using currently available mail systems, such as Lotus Notes or CC Mail, which are available from Lotus Development Corporation. Address lists associated with these mail systems may be accessed by the processes of the present invention in message processing unit 402 or 408 using known interfaces supported by the mail system. For example, Vendor Independent Messaging (VIM) is an example of a known interface support by many mail systems that may be used to access address books as well as initiate various functions, including, for example the sending of mail messages and attaching files to mail messages.

The actual storage and transmission of e-mail, including customized content, is implemented using conventional e-mail data formats-and protocols. The separation of these functions is shown for purposes of clearly illustrating the present invention. Of course, depending on the implementation, the processes of the present invention may be implemented directly within a mail system.

Figure 5:
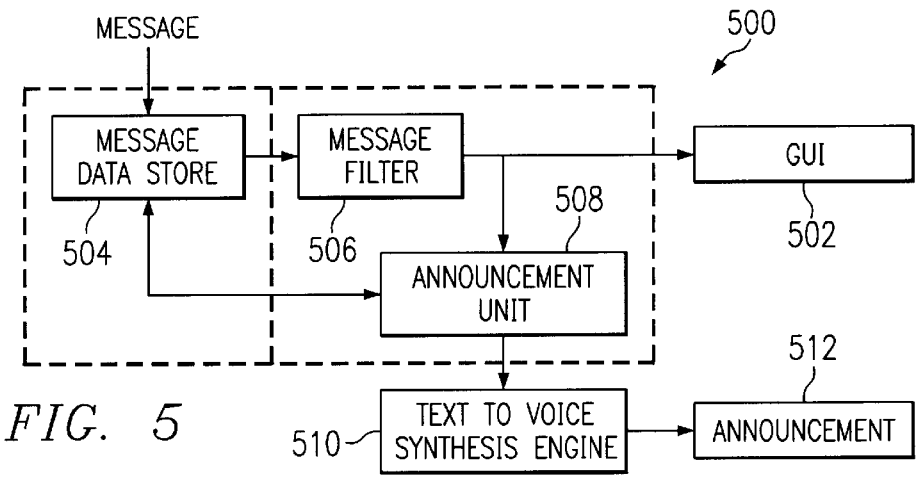
FIG. 5 is a block diagram illustrating the components within a message processing unit for providing synthesized voice announcements of information depicted in accordance with a preferred embodiment of the present invention.

Turning next to FIG. 5, a block diagram illustrating the components within a message processing unit for providing synthesized voice announcements of information is depicted in accordance with a preferred embodiment of the present invention. Message processing unit 500 receives messages and provides an appropriate display in GUI 502. E-mail messages received by message processing unit 500 are stored in message data store 504. Message filter 506 determines a disposition for the message, including whether or not that message is announced, and what announcement settings to apply (i.e., how to announce that particular message). The message processing unit then provides an appropriate display on GUI 502 of received messages including the types of messages.

Further, any message passed to announcement unit 508 from message filter 506 will be processed to present an audio announcement to the user. This unit includes settings for the type of announcement that has been selected or customized by the user. These settings may include the selection of a sound effect or to play a voice announcement in accordance with a preferred embodiment of the present invention. Voice announcements may include text with variables or tags for insertion of data filtered by message filter 506. Announcement unit 508 takes the message from message data store 504 and according to the setting stored in the announcement unit, data is extracted from the message and the desired announcement is constructed using the extracted data along with predefined text or referenced sound files. The desired announcement may include a set of one or more text strings. These text strings, if present, are then sent to voice synthesis engine 510 for presentation or announcement 512 to a user. Further, other notification options, such as various sound effects or prerecorded sound files may be presented to the user by announcement unit 508. The text may be processed by using processes currently employed in known text-to-speech programs, such as ViaVoice, which is available from International Business Machines Corporation. A user may specify multiple types of announcements through announcement unit 508 along with identifying data that is to be parsed from e-mail messages, such as, for example, the sender of the message and/or the subject of the message. In this manner, the announcement generated by text to voice synthesis engine 510 may, for example, present an announcement to the user as follows: "Excuse me, Steve Daniel's has just sent you mail about the plant trip", where "Steve Daniel's" and "plant trip" are parsed and extracted from a note from Steve Daniel's and combined with surrounding text to form an appropriate and informative announcement.

Figure 6:
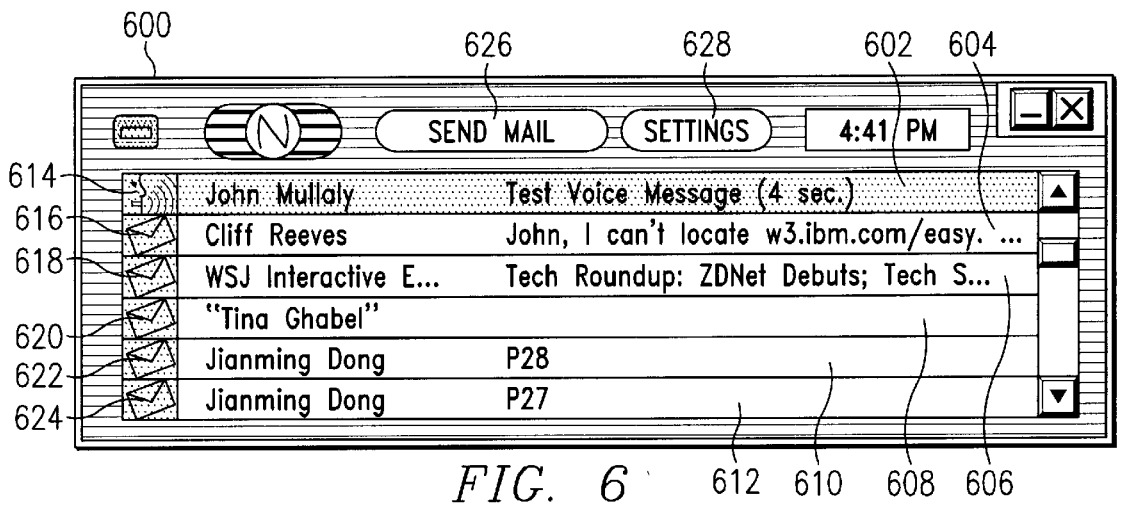
FIG. 6 is a display of a GUI used with a message processing unit depicted in accordance with a preferred embodiment of the present invention.

Turning now to FIG. 6, a display of a GUI used with message processing unit 500 is depicted in accordance with a preferred embodiment of the present invention. When messages received by a message processing unit are filtered and processed, GUI 600 is an example of an interface that may be displayed to a user in accordance with a preferred embodiment of the present invention. GUI 600 includes entries 602–612. In this example, each of the entries includes the sender of the message along with the subject of the message. Additionally, icons, such as icons 614–624, are displayed within the entries to illustrate the type of message received. In this example, icon 614 and entry 602 illustrate that a text voice message has been received while icons 616–624 illustrate that the entries associated with these icons are text messages. If a user wishes to send mail, the user may select send mail button 626. A user may also select a particular entry to display the message. In this example, a selection of settings button 628 allows for the display of various interfaces that are employed to allow a user to customize the synthesized voice announcement of information.

Figure 7:
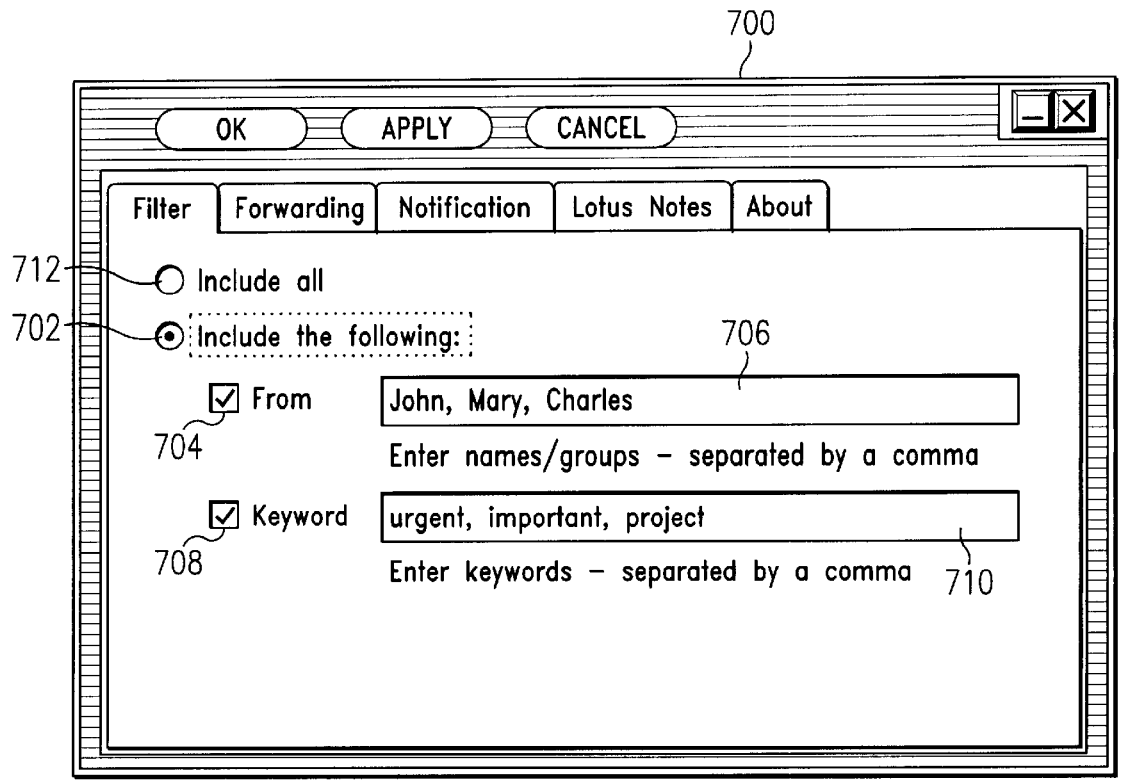
FIG. 7 is a display of an interfaces used to customize filtering of messages depicted in accordance with a preferred embodiment of the present invention.

With reference next to FIG. 7, a display of an interface used to customize filtering of messages is depicted in accordance with a preferred embodiment of the present invention. GUI 700 is used to customize filtering of messages received by a message-processing unit. These settings may be used to effect the filtering that occurs in a message filter, such as message filter 506 in FIG. 5. GUI 700 is displayed in response to selection of settings button 628 in FIG. 6.

In this example, the user may customize a number of settings. The user may selectively include information by selecting selection 702, which may be used to include the sender of the message and keywords. The message filter may be customized to filter all messages to identify messages that are to be announced. A message may be treated by the filter based on the sender of the message by selecting box 704 and entering the particular name to be filtered in field 706. Messages from multiple senders may also be treated by the filter by entering multiple names in field 706. Messages may also be treated by the filter based on the presence of keywords. Keywords from anywhere in the message may be searched for by a message filter through the selection of box 708. Keywords to be searched for may be entered in field 710. Of course the user may automatically include all names and keywords by selecting selection 712, which is a selection to include of the entries in fields 706 and 710 for filtering.

Of course, these settings are only meant as examples of possible types of information that may be used to filter an incoming e-mail message to see if it will be announced. Other types of information and other selections of portions of an e-mail message may be selected. For example, the user may be provided an option to filter on particular keywords in a subject field rather than filtering on keywords throughout the entire message.

Figure 8:
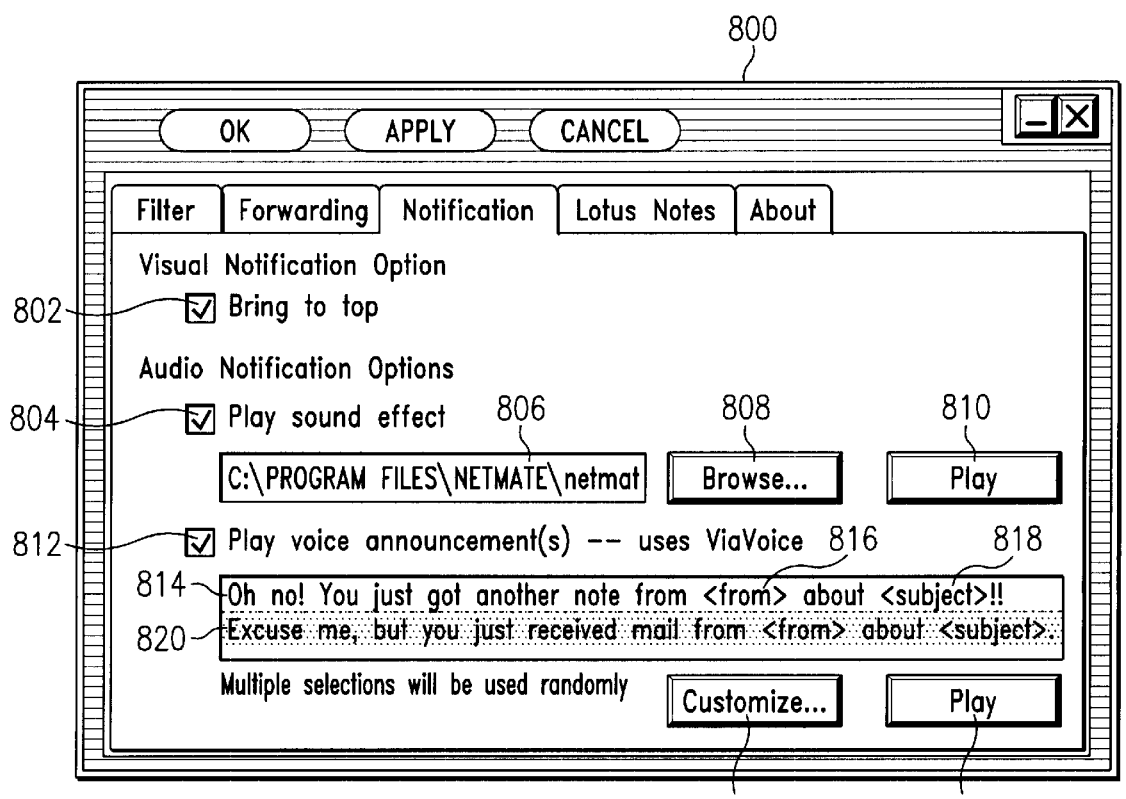
FIG. 8 is a display of a graphical user interface for customizing notification settings depicted in accordance with a preferred embodiment of the present invention.

In FIG. 8, a display of a graphical user interface for customizing notification settings is depicted in accordance with a preferred embodiment of the present invention. GUI 800 is an interface for customizing the notification for incoming messages. GUI 800 includes a visual notification option that may be selected by selecting box 802. This notification option will bring the window containing the list of messages to the top. This window is a GUI, such as GUI 600 in FIG. 6. The user also may select audio notification options. Playing a sound effect may be selected by the selection of box 804. The user may enter a particular sound effect that is to be used as part of the notification by typing the path and name of the file containing the sound effect in field 806. Alternatively, the user may search for various files for playing sound effects by selecting browse button 808. When the user has selected a particular file, the sound effect may be played by selecting play button 810.

The playing of one or more voice announcements in response to receiving an e-mail message may be initiated by selecting box 812. The various announcements may be selected from field 814. In this example, field 814 contains two selections. If multiple selections are made, the selection will be randomly selected for presenting or announcing messages. As can be in the announcement text displayed in field 814, tags 816, 818, and 820, are present. These tags are text enclosed in angle brackets. The tags correspond to predefined fields of information, such as the different portions of an e-mail message. In this example, tag 816 is a from tag (<from>) that is used to insert the text identifying the sender of the message into the announcement text. Tag 818 and tag 820 are subject tags that may be used to insert text from the subject fields of an e-mail message into the announcement text. When the insertions have been made, then the announcement can be played using a text-to-voice synthesis process. Users may also insert tags for recorded messages to be included in the announcement by specifying a sound file within the tag brackets, e.g. <c:\message1.wav>. Customizing of announcement text for messages may occur by selecting customize button 822. The messages themselves may be played for the user to listen to by selecting play button 824.

With reference now to FIG. 9, a diagram of an interface used to customize the playing of voice announcements is depicted in accordance with a preferred embodiment of the present invention. These voice announcements are played by using a known text-to-speech synthesis technology, such as that available in ViaVoice.

GUI 900 is an interface that may be used to provide various voice settings for the playing of voice announcements using text-to-speech synthesis processes. In this example, GUI 900 contains voice announcements in field 902. In addition, three entries, 904, 906, and 908, are present. The user may add additional voice announcements by entering those announcements in field 910. Entry of announcements into field 910 will allow a user to select add button 912 to add the new voice announcement to field 902. A selection of one of the voice announcements, such as entries 904, 906, or 908, will allow the use to delete a particular voice announcement by selecting delete button 914. These buttons are not active until the particular actions are taken, such as entry of text into field 910 or selection of an entry in field 902 occurs. Selection of restore defaults button 916 will place all entries with default entries. Selection of okay button 918 will result in any changes made to voice announcements being stored so that they will take effect. Cancel button 920 may be selected if the user decides that the changes made are not wanted.

Figure 10:
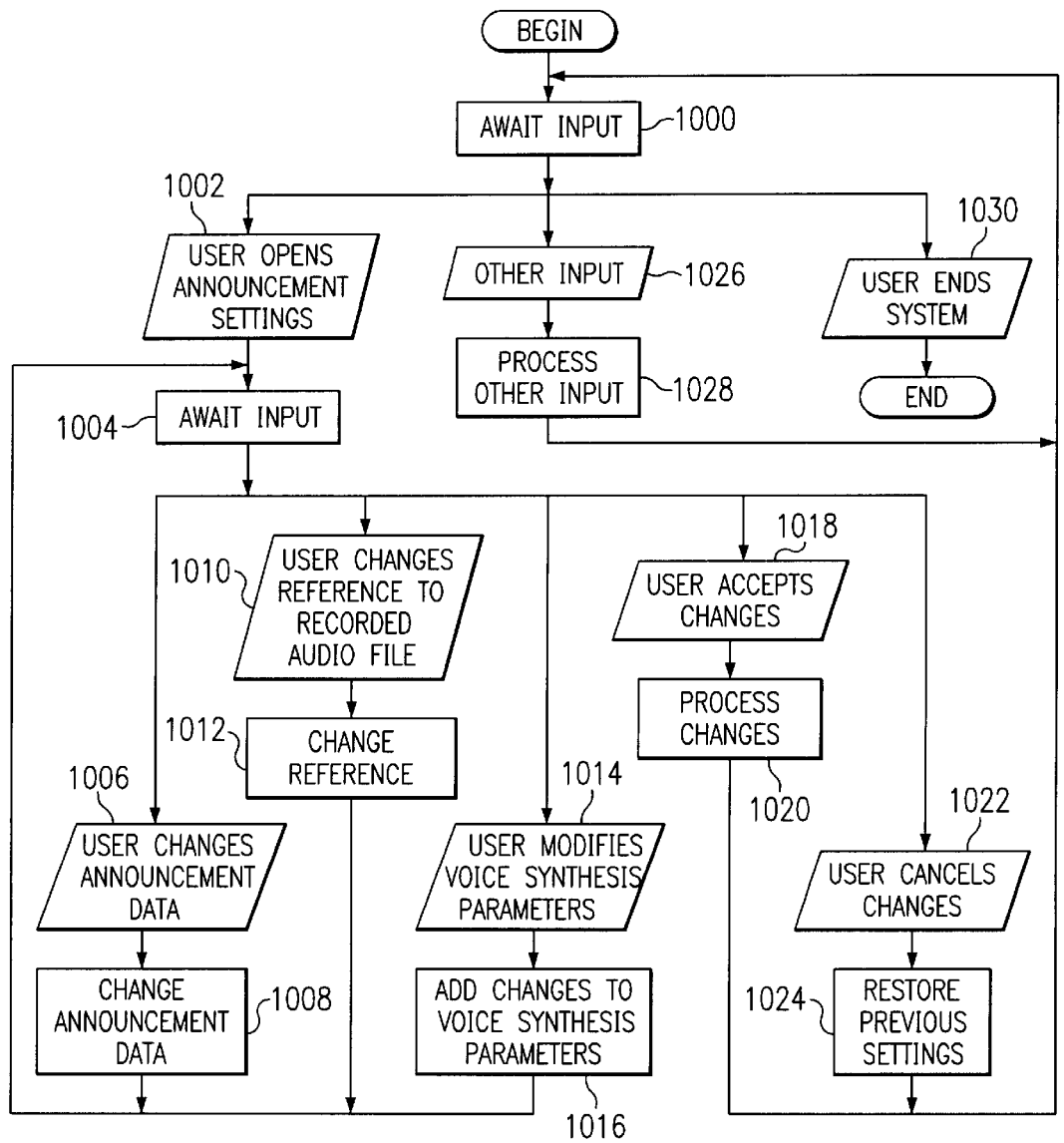
FIG. 10 is a flowchart of a process for user customization of synthesized voice announcements in accordance with a preferred embodiment of the present invention.

With reference now to FIG. 10, a flowchart of a process for user customization of synthesized voice announcements is depicted in accordance with a preferred embodiment of the present invention. The process begins by awaiting user input (step 1000). In response to a user opening announcements settings (step 1002), the process waits for the user to enter more input (step 1004). In response to the user changing the announcement data (step 1006), the changes to the announcement data are stored for use in making announcements for receipt of messages (step 1008) with the process then returning to step 1004 to await additional user input. The changes are stored temporarily until the user accepts or cancels the changes. These changes may include, additions to the announcement text, modifications to the announcement text, or deleting the announcement text. A user may add additional announcement text in which certain text will be used according to a policy. The policy may be to randomly choose between different announcement text or to select announcement text based on the identification of the sender.

In response to receiving user input to changes references to one or more recorded audio files (step 1010), the changes to the references are stored (step 1012) with the process then returning to step 1004. The changes are stored on a temporary basis until the user accepts or cancels the changes. Through these steps the user is able to add, change, or cancel a recording for use in announcing receipt of a message. When user input to change voice synthesis parameters are received (step 1014), the changes are stored (step 1016) on a temporary basis until the user accepts or cancels the changes. These changes to the voice synthesis profile may be used to select different parameters, such as, for example, a sound profile or speed of presentation. Different sound profiles may be desirable to uniquely identify messages from selected users or to provide emphasis for selected content. One sound profile might be used for a recipient from which the user is expecting a message while another sound profile may be used to indicate the presence of confidential information. A third sound profile may be used as a default for all other messages. The process then returns to step 1004 to await additional user input.

In response to receiving user input in the form of an acceptance of the changes (step 1018), the changes are processed and stored for use in announcing the receipt of messages (step 1020) with the process then returning to step 1000. In response to receiving user input in the form of a cancellation the changes (step 1022), any changes stored temporarily are deleted and the previous settings are restored (step 1024) with the process then returning to step 1000.

Upon receiving user input of other input (step 1026), that input is processed (step 1028) with the process then returning to step 1000 as described above. This other input may include, for example, forwarding options or preference options for the particular e-mail program. If the user input is to end the system (step 1030), the process then terminates.

With reference now to FIG. 11, a process for generating announcements in response to receiving a message is depicted in accordance with a preferred embodiment of the present invention. The process begins by waiting for a message (step 1100). In response to receiving a message, the message is compared to the message filter (step 1102). This message filter is used to determine a disposition for the message, including whether or not that message is announced, and what announcement settings to apply (i.e., how to announce that particular message). A determination is then made as to whether an announcement is to be made (step 1104). This determination is made based on the filter settings compared to the received message. If an announcement is to be made, the announcement is generated and output (step 1106) with the process returning to step 1100 to await the receipt of more messages. If an announcement is not to be made in step 1104, the process returns to step 1100 to await another message.

Figure 12:
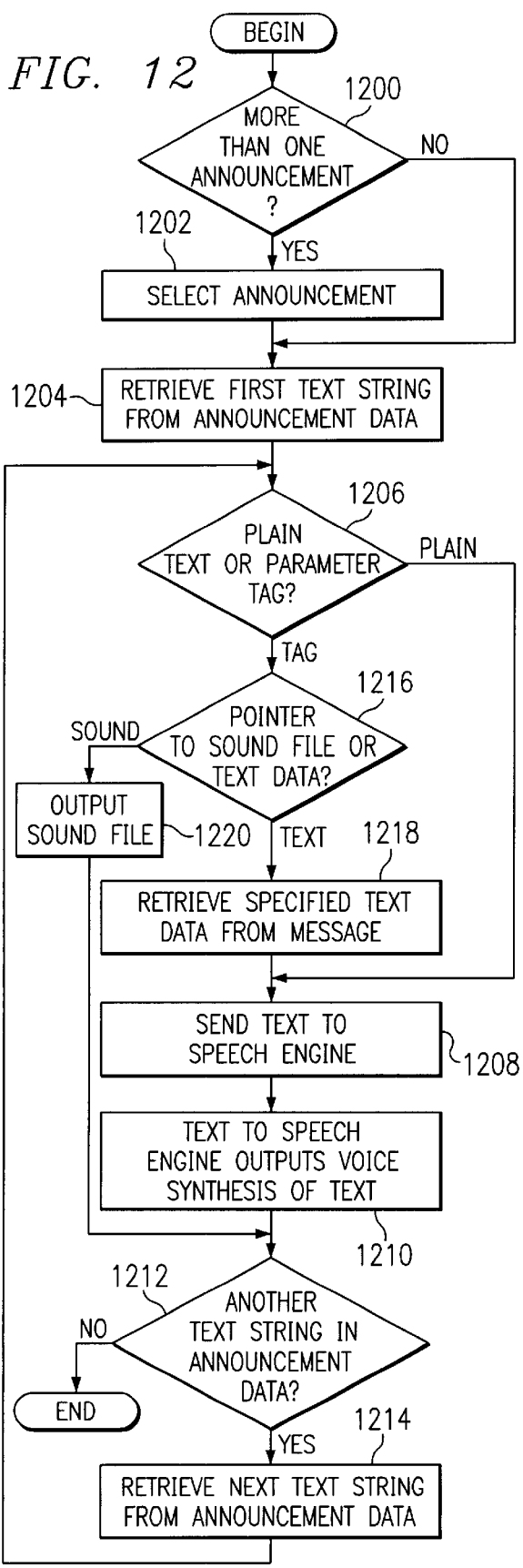
FIG. 12 is a flowchart of a generating and outputting an announcement depicted in accordance with a preferred embodiment of the present invention.

With reference now to FIG. 12, a flowchart of a generating and outputting an announcement is depicted in accordance with a preferred embodiment of the present invention. The processes describe with respect to FIG. 12 are a more detailed explanation of step 1106 in FIG. 11.

The process begins by determining whether more than one announcement is present (step 1200). If more than one announcement is present, an announcement is selected using a policy or set of rules (step 1202). The policy or rules used may be for example, to select the announcement randomly. Alternatively, the policy or rules used may be to selected the announcement based on the identity of the sender of the message. Thereafter the first text string is retrieved from the announcement settings (step 1204). The process also proceed directly to step 1204 if only a single announcement is present in step 1200. The text strings making up the announcement are announcement data.

A determination is then made as to whether the text string is plain text or an indicator or tag (step 1206). If the text string is plain text, the process then sends the text to a text to speech engine for processing and output (step 1208), and the text to speech engine outputs a voice synthesis of the text (step 1210). Then, a determination is made as to whether another text string is present in the announcement data (step 1212). If another text string is present, the next text string is retrieved from the announcement data (step 1214) with the process then returning to step 1206.

Referring back to step 1206, if the text string is a tag or indicator, a determination is made as to whether the tag or indicator points to a sound file or text data (step 1216). If the tag or indicator points to text data, the text data is retrieved from the message (step 1218) with the process then proceeding to step 1208 as previously described. The tag may point to various fields in the message or may cause search for keywords within the message. The text data meeting the requirements or search parameters are the text data retrieved in step 1218. On the other hand, if the tag or indicator points to a sound file, the sound file will be output or presented to the user (step 1220) with the process then proceeding to step 1212 as previously described.

With reference again to step 1212, if another text string is not present, the process then terminates.

Figure 13:
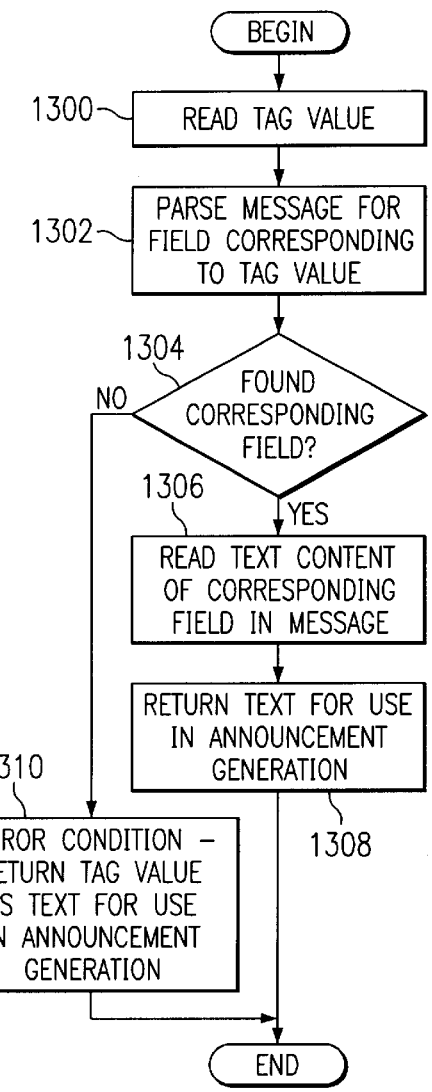
FIG. 13 is a flowchart of a process processing tags in announcement data illustrated in accordance with a preferred embodiment of the present invention.

With reference now to FIG. 13, a flowchart of a process processing tags in announcement data is illustrated in accordance with a preferred embodiment of the present invention. FIG. 13 provides a more detailed illustration of step 1218 in FIG. 12.

The process begins by reading the tag value (step 1300). Thereafter, the message is parsed for a field or keyword corresponding to the tag value (step 1302). Fields or keywords in the message may be searched for text strings to be used in the generation of an announcement. A determination is then made as to whether the corresponding field or keyword is present (step 1304). If the corresponding field or keyword is present, the text string in the corresponding field or the key word is read (step 1306), and the read text string is then returned for use in generating an announcement (step 1308) with the process terminating thereafter. With reference again to step 1304, if the corresponding field or keyword is absent from the message, an error condition is present and the tag value is returned as text for use in generating the announcement (step 1310) with the process terminating thereafter.

With reference now to FIG. 14, a flowchart of a process for selecting a profile for use in presenting text through a text-to-voice synthesis engine is depicted in accordance with a preferred embodiment of the present invention. The process begins by determining whether the identification of the sender matches a sound profile (step 1400). If a match is present, the associated sound profile is used to perform the speech to text synthesis (step 1404) with the process terminating thereafter. The presently available text-to-speech technology supports different sounding voice profiles. The present invention takes advantage of selecting different voice profiles depending on the identification of the sender. Different voices can be used to announce the arrival of mail from different senders.

With reference again to step 1400, if the sender of the message does not match a sound profile, then a defaults sound profile is used to perform the text-to-speech synthesis (step 1402).

Thus, the present invention provides an improved method and apparatus for notifying a user that a message has arrived. The present invention uses voice synthesis to announce various details about the message, such as sender and the subject of the message. In this manner, the present invention provides an advantage over presently available announcement systems and allows users to be better informed about the information received without having to shift form their current task. Furthermore, the present invention allows users to customize the words with which announcements are made, as well as the level of detail included from the information source.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Although, the depicted examples are directed mainly for the processing of e-mail messages, the processes of the present invention may be applied to other kinds of messages, such as, for example, without limitation, electronic phone messages and bulletins. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for announcing receipt of a message, the method comprising the data processing system implemented steps of:

receiving the message;

parsing the message to extract selected data to form extracted data, wherein the selected data is text matching a user customizable criteria;

responsive to parsing the message, combining the extracted data with announcement data to form output data; and announcing receipt of the message using the output data.

2. The method of claim 1, wherein the announcement data includes text with an indication of placement of the extracted data matching the criteria.

3. The method of claim 2, wherein the indication comprises at least one tag.

4. The method of claim 2, wherein the announcement data further includes a recording.

5. The method of claim 2, wherein the step of announcing comprises sending the output data to a text to speech synthesis process.

6. The method of claim 1, wherein the selected data includes an identification of the sender of the message.

7. The method of claim 1, wherein the selected data includes key words from the message.

8. The method of claim 1, wherein the data processing system is a personal computer.

9. The method of claim 1, wherein the data processing system is a personal digital assistant.

10. The method of claim 1, wherein the user customizable criteria is a criteria determined by the user.

11. The method of claim 1, wherein the user customizable criteria is user specified text in the body of the message.

12. The method of claim 1, wherein the user customizable criteria includes user specified text in more than one field of the message.

13. The method of claim 12, wherein the more than one field of the message includes the body of the message.

14. The method of claim 1, wherein the selected text includes text of a name of a sender of the message.

15. A method in a data processing system for announcing receipt of a message, the method comprising the data processing system implemented steps of:
   receiving the message, wherein the message includes text;
   parsing the message for selected text, wherein the selected text includes keywords;
   selectively combining the selected text with announcement text to create modified announcement text; and
   transforming the modified announcement text into synthesized speech.

16. The method of claim 15, further comprising:
   playing a sound effect in conjunction with transforming the modified announcement text into synthesized speech.

17. The method of claim 15, wherein the message is originated by a sender and wherein the step of transforming includes:
   determining whether a sound profile is associated with the sender; and
   responsive to a determination that a sound profile is associated with the sender, using the sound profile in performing a text to speech synthesis of the modified announcement text.

18. The method of claim 17, wherein the step of transforming further includes:
   responsive to a determination that a sound profile is associated with the sender, using the sound profile in performing a text to speech synthesis of the modified announcement text.

19. The method of claim 15, wherein the selected text is combined with the announcement text using tags located within the announcement text.

20. The method of claim 15, wherein the keyword appears in the body of the message.

21. A data processing system for announcing receipt of a message, the data processing system comprising:
   receiving means for receiving the message;
   parsing means for parsing the message to extract selected data to form extracted data, wherein the selected data is text matching a user customizable criteria;
   combining means, responsive to parsing the message, for combining the extracted data with announcement data to form output data; and
   announcing means for announcing receipt of the message using the output data.

22. The data processing system of claim 21, wherein the announcement data includes text with an indication of placement of the extracted data matching the criteria.

23. The data processing system of claim 23, wherein the indication comprises at least one tag.

24. The data processing system of claim 21, wherein the announcement data further includes a recording.

25. The data processing system of claim 21, wherein the announcing means of announcing comprises sending the output data to a text to speech synthesis process.

26. The data processing system of claim 21, wherein the selected data includes an identification of the sender of the message.

27. The data processing system of claim 21, wherein the selected data includes key words from the message.

28. The data processing system of claim 21, wherein the data processing system is a personal computer.

29. The data processing system of claim 21, wherein the data processing system is a personal digital assistant.

30. A data processing system for announcing receipt of a message, the data processing system comprising:
   receiving means for receiving the message, wherein the message includes text;
   parsing means for parsing the message for selected text, wherein the selected text includes keywords;
   combining means for selectively combining the selected text with announcement text to create modified announcement text; and
   transforming means for transforming the modified announcement text into synthesized speech.

31. The data processing system of claim 30, wherein the selected text includes text of a name of a sender of the message.

32. The data processing system of claim 31, further comprising:
   playing means for playing a sound effect in conjunction with transforming the modified announcement text into synthesized speech.

33. The data processing system of claim 31, wherein the message is originated by a sender and wherein the transforming means includes:
   determination means for determining whether a sound profile is associated with the sender; and
   using means, responsive to a determination that a sound profile is associated with the sender, for using the sound profile in performing a text to speech synthesis of the modified announcement text.

34. The data processing system of claim 33, wherein the transforming means further includes:
   using means, responsive to a determination that a sound profile is associated with the sender, for using the sound profile in performing a text to speech synthesis of the modified announcement text.

35. The data processing system of claim 31, wherein the selected text is combined with the announcement text using tags located within the announcement text.

36. A computer program product in a computer readable medium for announcing receipt of a message, the computer program product comprising:
   first instructions for receiving the message;
   second instructions for parsing the message to extract selected data to form extracted data, wherein the selected data is text matching a user customizable criteria;
   third instructions, responsive to parsing the message, for combining the extracted data with announcement data to form output data; and
   fourth instructions for announcing receipt of the message using the output data.

37. A computer program product in a computer readable medium for announcing receipt of a message, the computer program product comprising:
   first instructions for receiving the message, wherein the message includes text;
   second instructions for parsing the message for selected text, wherein the selected data is text matching a user customizable criteria;
   third instructions for selectively combining the selected text with announcement text to create modified announcement text; and
   fourth instructions for transforming the modified announcement text into synthesized speech.

* * * * *

UNITED STATES PATENT AND TRADEMARK OFFICE
CERTIFICATE OF CORRECTION

PATENT NO. : 6,553,341 B1
DATED : April 22, 2003
INVENTOR(S) : Mullaly et al.

It is certified that error appears in the above-identified patent and that said Letters Patent is hereby corrected as shown below:

Column 13,
Line 53, after "claim", delete "23" and insert -- 22 --.
Lines 55 and 57, after "claim", delete "21" and insert -- 22 --.

Column 14,
Lines 15, 20 and 35, after "claim", delete "31" and insert -- 30 --.

Signed and Sealed this

Seventh Day of October, 2003

JAMES E. ROGAN
*Director of the United States Patent and Trademark Office*